United States Patent
Shao

(10) Patent No.: US 11,519,752 B2
(45) Date of Patent: Dec. 6, 2022

(54) COUPLER ELEMENT SHAPES FOR INDUCTIVE POSITION SENSORS

(71) Applicant: KSR IP Holdings, LLC, Wilmington, DE (US)

(72) Inventor: Lingmin Shao, London (CA)

(73) Assignee: KSR IP Holdings, LLC, Wilmington, DE (US)

( * ) Notice: Subject to any disclaimer, the term of this patent is extended or adjusted under 35 U.S.C. 154(b) by 43 days.

(21) Appl. No.: 16/570,216

(22) Filed: Sep. 13, 2019

(65) Prior Publication Data

US 2020/0088549 A1    Mar. 19, 2020

Related U.S. Application Data

(60) Provisional application No. 62/731,432, filed on Sep. 14, 2018.

(51) Int. Cl.
G01D 5/20    (2006.01)

(52) U.S. Cl.
CPC .......... *G01D 5/2066* (2013.01); *G01D 5/202* (2013.01); *G01D 5/2013* (2013.01)

(58) Field of Classification Search
CPC ........ G01D 5/20; G01D 5/2013; G01D 5/202; G01D 5/2026; G01D 5/2046; G01D 5/2053; G01D 5/206; G01D 5/2066; G01D 5/2073; G01D 5/2086; G01D 5/2216; G01D 5/2225; G01D 5/2233; G01D 5/142; G01D 5/145; G01D 5/147; G01B 7/30; G01B 7/14
See application file for complete search history.

(56) References Cited

U.S. PATENT DOCUMENTS

| | | | |
|---|---|---|---|
| 5,323,109 A | 6/1994 | Mehnert et al. | |
| 6,304,076 B1 * | 10/2001 | Madni | G01D 5/2053 |
| | | | 318/660 |
| 7,191,759 B2 | 3/2007 | Lee | |
| 7,276,897 B2 | 10/2007 | Lee | |
| 7,538,544 B2 | 5/2009 | Lee | |
| 7,906,960 B2 | 3/2011 | Lee | |
| 7,911,354 B2 | 3/2011 | Kim | |

(Continued)

FOREIGN PATENT DOCUMENTS

| | | |
|---|---|---|
| CN | 1486540 A | 3/2004 |
| CN | 101868695 A | 10/2010 |

(Continued)

*Primary Examiner* — David M Schindler
(74) *Attorney, Agent, or Firm* — Dinsmore & Shohl LLP

(57) ABSTRACT

In accordance with one embodiment of the present disclosure, an inductive position sensor assembly is provided. The inductive sensor assembly includes a sensor and a coupler element. The sensor includes a transmitter coil having an inner diameter and an outer diameter and a receiver coil positioned within the outer diameter of the transmitter coil. The coupler element has a geometric continuous curve shape. The coupler element is positioned within the outer diameter of the transmitter coil such that a maximum diameter of the geometric continuous curve shape is the outer diameter of the transmitter coil. When the coupler element is moved, the geometric continuous curve shape of the coupler element modify an inductive coupling between the transmitter coil and the receiver coil.

20 Claims, 9 Drawing Sheets

(56) References Cited

U.S. PATENT DOCUMENTS

| | | | |
|---|---|---|---|
| 8,098,061 B2 | 1/2012 | Elliott et al. | |
| 8,508,242 B2 | 8/2013 | Shao et al. | |
| 9,983,045 B2 | 5/2018 | O'Neill | |
| 10,278,288 B2 | 4/2019 | Elliott et al. | |
| 10,320,499 B2 | 6/2019 | Lomnitz | |
| 2002/0000129 A1* | 1/2002 | Madni | G01D 5/2053 73/862.326 |
| 2003/0020642 A1 | 1/2003 | Ely et al. | |
| 2004/0007926 A1* | 1/2004 | Tsukada | H02P 6/16 310/68 B |
| 2005/0225320 A1 | 10/2005 | Lee | |
| 2007/0001666 A1 | 1/2007 | Lee | |
| 2008/0054887 A1* | 3/2008 | Lee | H01F 5/00 324/207.17 |
| 2009/0079422 A1 | 3/2009 | Lee | |
| 2011/0181302 A1 | 7/2011 | Shao et al. | |
| 2012/0223700 A1* | 9/2012 | Shao | G01D 5/2066 324/207.16 |
| 2012/0293166 A1* | 11/2012 | Lee | G01D 5/2046 324/207.17 |
| 2014/0327432 A1* | 11/2014 | Elliott | G01D 5/2066 324/207.16 |
| 2015/0301084 A1* | 10/2015 | Elliott | G01D 5/2046 324/207.15 |
| 2016/0131503 A1 | 5/2016 | Goto et al. | |
| 2017/0292857 A1 | 10/2017 | Leidich et al. | |

FOREIGN PATENT DOCUMENTS

| | | |
|---|---|---|
| CN | 101939615 A | 1/2011 |
| CN | 102388327 A | 3/2012 |
| CN | 103547890 A | 1/2014 |
| CN | 105164502 A | 12/2015 |
| DE | 102016224854 A1 | 6/2018 |
| EP | 1083408 A2 | 3/2001 |
| EP | 1078226 B1 | 10/2003 |
| FR | 2771864 A1 | 6/1999 |
| JP | H088621 A | 1/1996 |
| JP | H10122806 A | 5/1998 |
| KR | 10-2010-0003172 A | 1/2010 |
| KR | 101491507 B1 | 2/2015 |

* cited by examiner

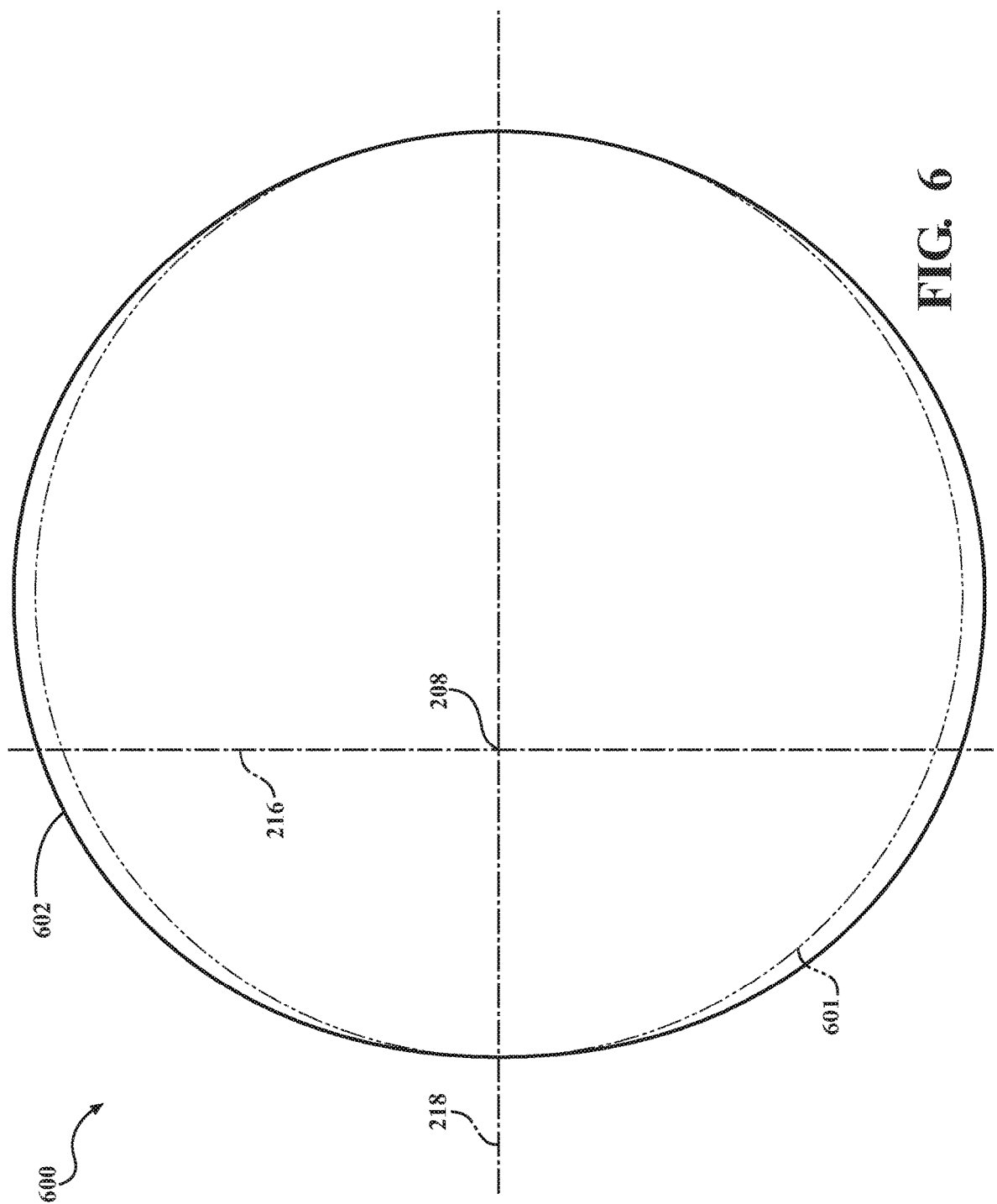

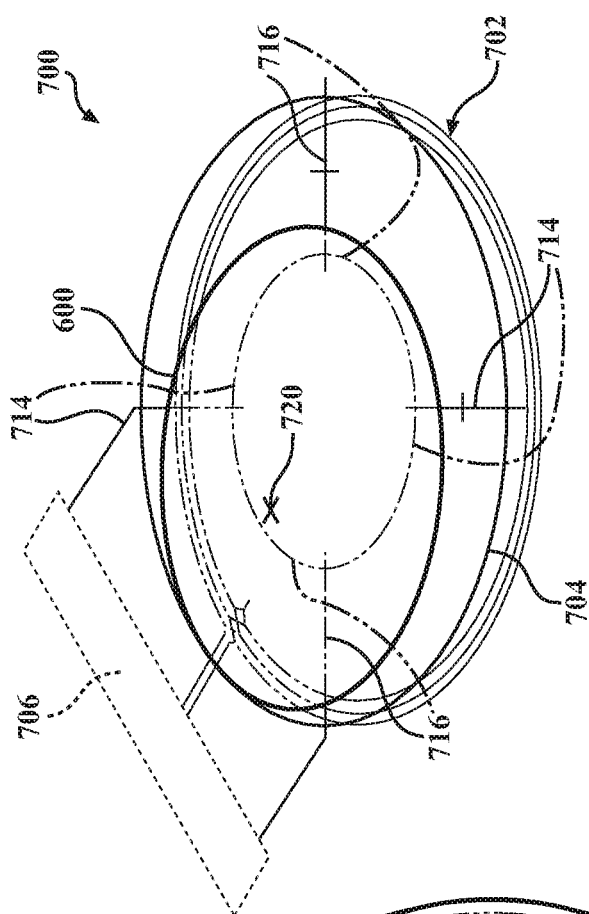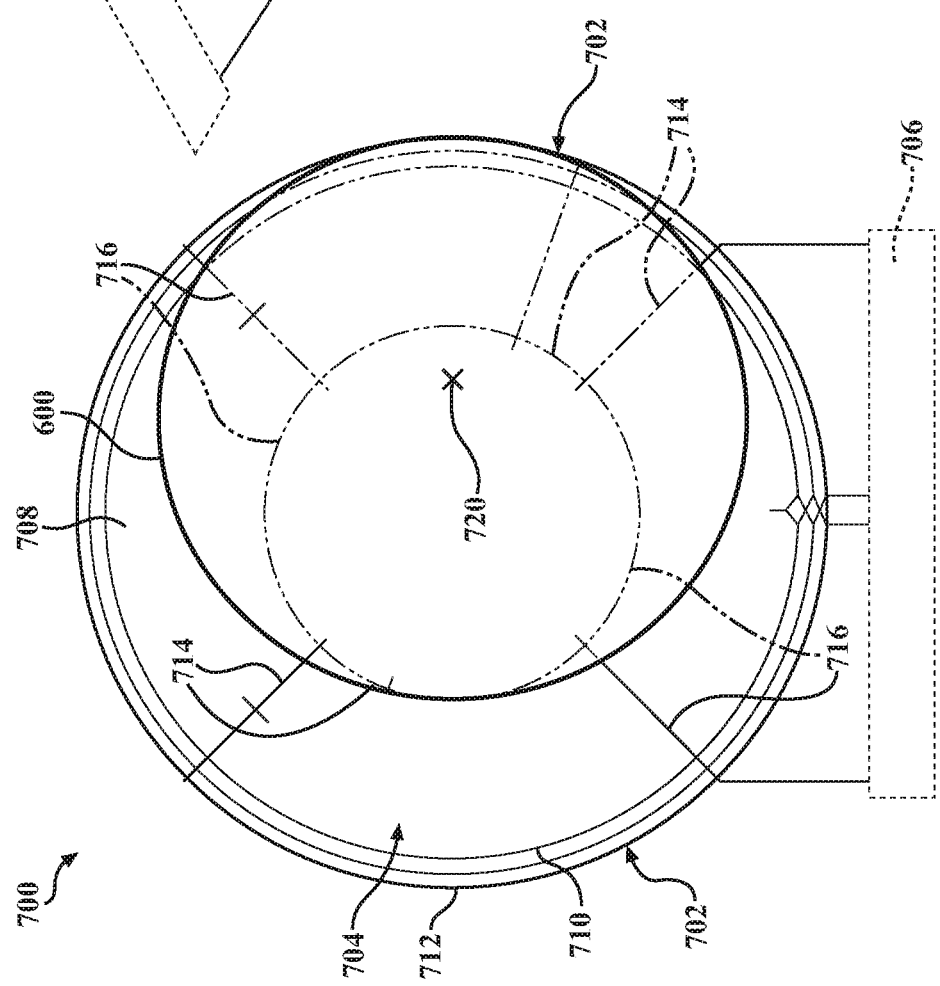

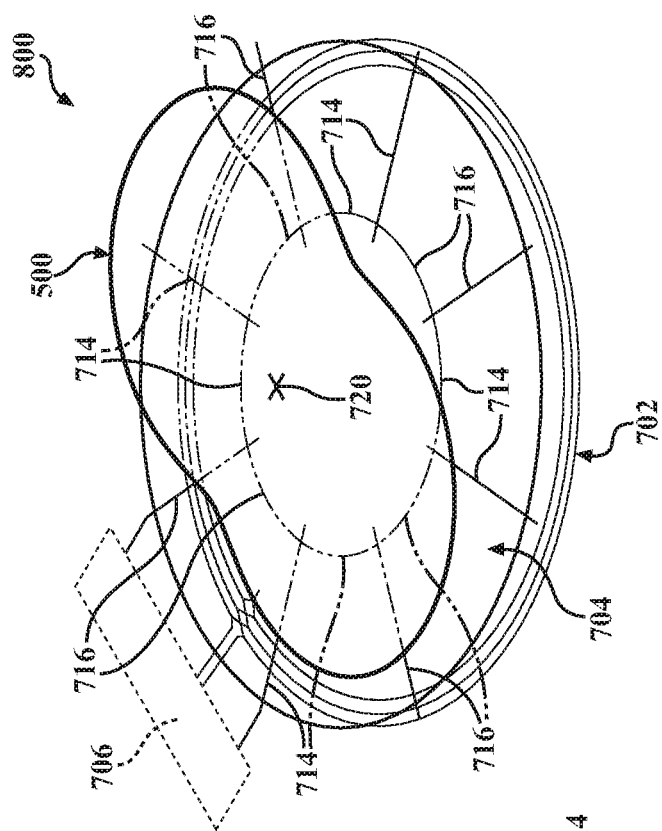
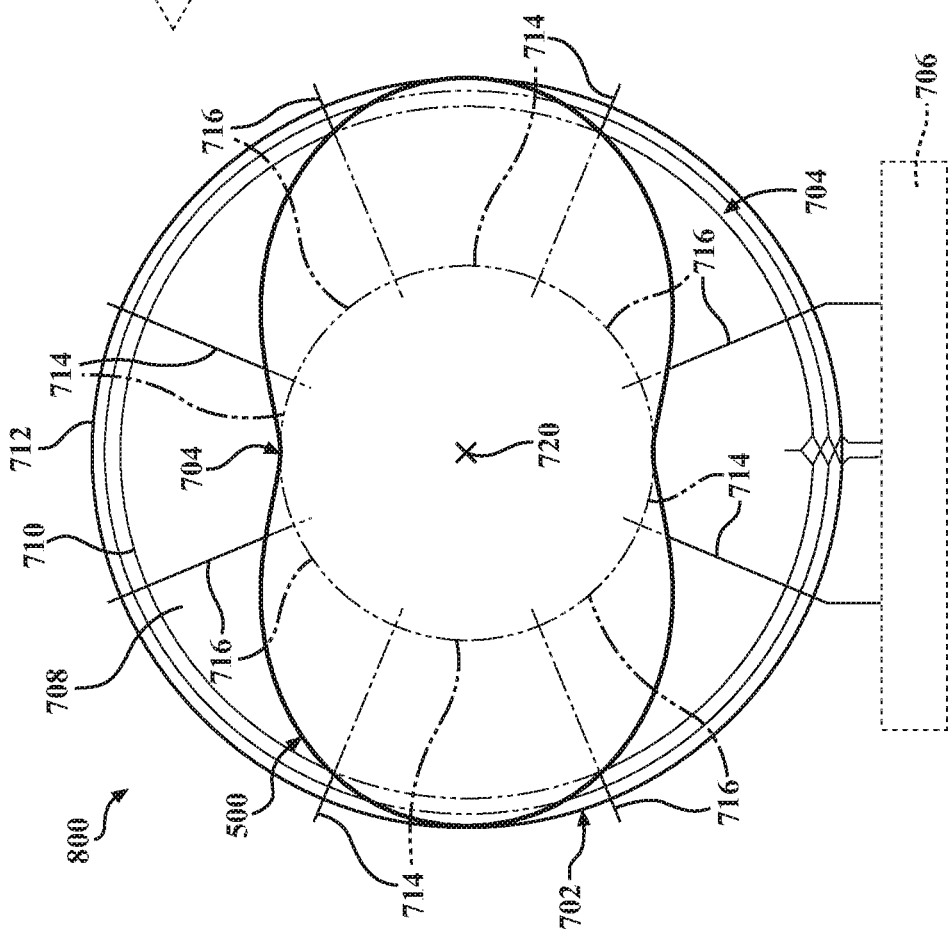
FIG. 8B
FIG. 8A

COUPLER ELEMENT SHAPES FOR INDUCTIVE POSITION SENSORS

CROSS REFERENCE TO RELATED APPLICATIONS

This utility patent application claims priority from U.S. Provisional Patent Application Ser. No. 62/731,432, filed on Sep. 14, 2018, the entire contents of which is incorporated herein in its entirety.

TECHNICAL FIELD

This invention relates to inductive position sensor systems, and in particular, to coupler elements in inductive position sensors that geometrically eliminate high order harmonic errors.

BACKGROUND

Inductive sensors utilize a coupler that moves over transmitter coil sections to determine the position of a target associated with the coupler. The sensors produce eddy currents in the receiving coils that are proportional to the position of the connector over the coils. The eddy currents are measured to produce an analog signal that is proportional to the position of the coupler along the coils. However, there are a number of errors that must be corrected in order to provide an accurate position. The sources of error include the geometric shape or contour of the coupler itself. That is, in applications where more than a one-pole coupler is needed, the coupler generally has a geometric shape or contour that includes sharp corners, straight edges, abrupt changes, and/or the like. As such, these geometric shapes or contour has an influence of the eddy currents and the overall position detection of the coupler over the coils.

Accordingly, there is a need for a coupler geometric shape or contour that does not influence or minimizes the influence on the eddy currents.

SUMMARY

In one embodiment, an inductive position sensor assembly is provided. The inductive sensor assembly includes a sensor and a coupler element. The sensor assembly includes a transmitter coil having an inner diameter and an outer diameter and a receiver coil positioned within the outer diameter of the transmitter coil. The coupler element has a continuous curve shape. The coupler element is positioned within the outer diameter of the transmitter coil such that a maximum diameter of the continuous curve shape is the outer diameter of the transmitter coil. When the coupler element is moved, the continuous curve shape of the coupler element modifies an inductive coupling between the transmitter coil and the receiver coil.

These and additional features provided by the embodiments described herein will be more fully understood in view of the following detailed description, in conjunction with the drawings.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a one-pole continuous curve contour coupler according to one or more embodiments herein;

FIG. 7A schematically depicts a top view of a sensor assembly having a one-pole coupler shape, a transmitter coil, and receiving coils according to one or more embodiments herein;

FIG. 7B schematically depicts a perspective isometric view of the sensor assembly of FIG. 7A according to one or more embodiments herein;

FIG. 8A schematically depicts a top view of a sensor assembly having a coupler shape, a transmitter coil, and receiving coils according to one or more embodiments herein;

FIG. 8B schematically depicts a perspective isometric view of the sensor assembly of FIG. 8A according to one or more embodiments herein.

DETAILED DESCRIPTION OF THE INVENTION

Embodiments described herein are directed to an inductive position sensor assembly. The inductive sensor assembly includes a sensor and a coupler element. The sensor includes a transmitter coil having an inner diameter and an outer diameter and a receiver coil positioned within the outer diameter of the transmitter coil. The coupler element has a geometric continuous curve shape. The coupler element is positioned within the outer diameter of the transmitter coil such that a maximum diameter of the geometric continuous curve shape is the outer diameter of the transmitter coil. The geometric continuous curve shape is a contour for many different poles including a one-pole, a two-pole, a three-pole and a four-pole sensor assembly. It should be understood that the continuous coupler contour has a smooth profile that leads to improved linearity and air gap performance. Further, the smooth profile of the continuous coupler contour enhances manufacturability, reduces tooling wear due to the reduction in sharp corners, and reduces the stress concentration on the coupler, the sensor assembly, a shaft, and/or the like.

As such, when the coupler element is moved, the geometric continuous curve shape of the coupler element modifies an inductive coupling between the transmitter coil and the receiver coil such that high order harmonic components found in a waveform of a receiving signal are compensated.

Figure 1:
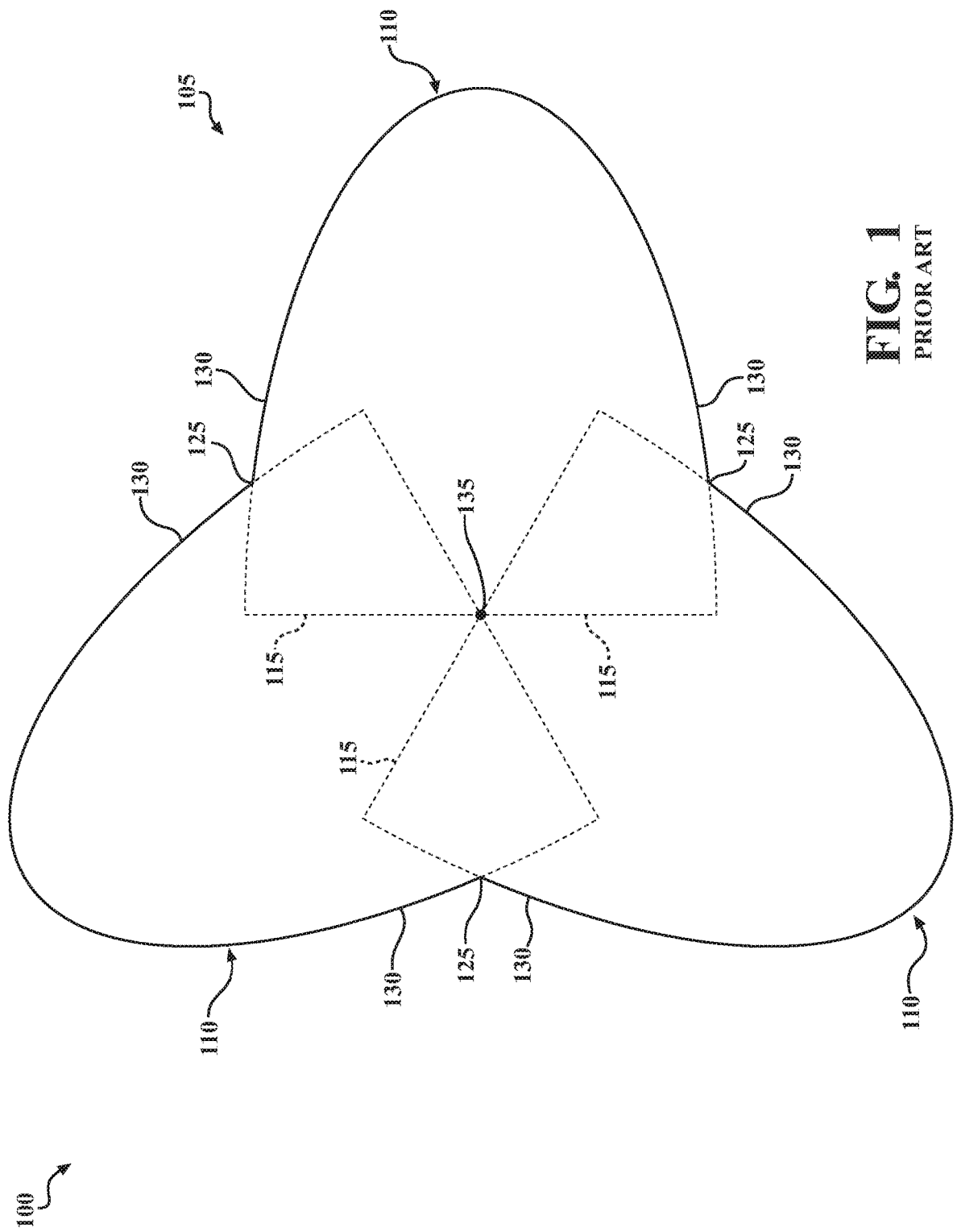
FIG. 1 schematically depicts a top view of a prior art coupler geometric shape according to one or more embodiments herein.

Now referring to FIG. 1, a prior art coupler 100 may geometrically include a coupler contour that has half-oval shapes 105 that may overlap and/or interconnect with one another. Generally, the number of half-oval shapes 105 depends on the number of poles of the sensor assembly. As illustrated in FIG. 1, the prior art coupler 100 is a three-pole coupler and, therefore, has three half-ovals 110, or lobes, that geometrically intersect at a center point 135. The three half-ovals 110, or lobes, each include a contour that is generally not a continuous curve, as indicated by a plurality of dotted lines 115 that correspond to each half-oval 110. As such, the three half-ovals 110, or lobes, have a plurality of sharp transitions at interconnection portions 125 between the three half-ovals 110, or lobes. Further, near these interconnection portions 125, the prior art couple may further include linear or nearly linear portions 130. As such, the sharp transitions at the interconnection portions 125 and the half-oval 110 includes nearly linear portions 130 that create a plurality of errors in determining the exact position of the prior art coupler 100 during movement. For example, the half-oval shapes 105, or contour, disrupts eddy currents passing through the prior art coupler 100, which causes high order harmonic components which in turn cause a waveform of a receiving signal to deviate from a pure sinusoidal waveform. Further, linearity issues that affect the performance of an air gap in the sensor assembly is present in the prior art coupler 100 during movement.

Figure 2:
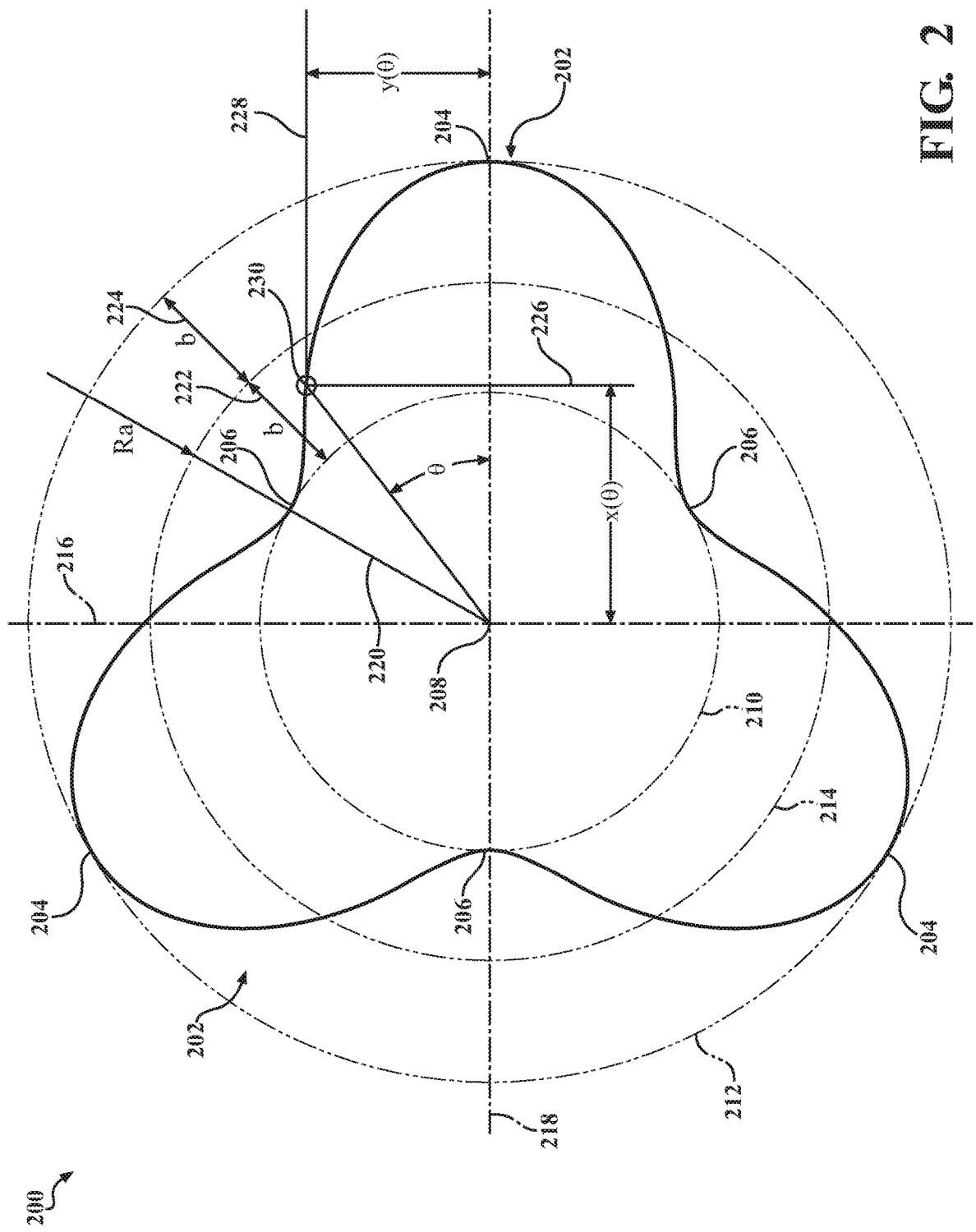
FIG. 2 schematically depicts a top view of a coupler geometric shape including the mathematical indicia according to one or more embodiments herein.

Now referring to FIG. 2., an example coupler 200, illustrated as the solid line, has a single curvature of a continuous curve. As such, the example coupler 200 of FIG. 2 has a constant curvature, which includes less sharp or elongated transitions between a plurality of lobes 202 such that the lobes and/or portions of each of the plurality of lobes 202 have a greater curve or arc. As such, the example coupler 200 is less linear than the prior art coupler 100 of FIG. 1 resulting in an improved receiving signal, as discussed in greater detail herein.

Now referring to FIGS. 3-6, the example coupler 300, 400, 500, and 600, each are illustrated as the solid line, has a single curvature of a continuous curve. The prior art coupler 301, 401, 501, and 601, illustrated as a dashed-dot-dot line, is intended to illustrate the geometric differences between the example coupler 300, 400, 500, and 600, and the prior art coupler 301, 401, 501, and 601, as discussed in greater detail herein. It should be appreciated that the prior art coupler 401 may be the same as prior art coupler 100 only illustrated again to highlight geometric differences in comparison to example coupler 400, in which example coupler 400 may be the same geometrically as the example coupler 200 (FIG. 2). It should also be appreciated that each of the couplers 300, 400, 500, and 600 incorporate geometrical differences, depending on the pole of the sensor assembly 700 (FIG. 7), as discussed in greater herein, to form a target. That is, each of the couplers 300, 400, 500, and 600 is the target, or a coupler element, configured to modify an inductive coupling between a transmitter coil 702 (FIG. 7) and a two-part receiver coil 704 (FIG. 7), as discussed in greater detail herein. That is, it should be appreciated that the geometric shape of each example coupler 300, 400, 500, and 600 corrects issues of concentricity errors, which in turn generate deviations in the sensor assembly output curve, or linearity errors.

In some embodiment's, each of the couplers 300, 400, 500, and 600 is a metallic material. Further, in some embodiments, each of the couplers 300, 400, 500, and 600 may be formed in a shaft or other device that is configured to move the coupler 300, 400, 500, and/or 600, such as by rotation, linearly, or otherwise move the coupler. In some embodiments, each of the couplers 300, 400, 500, and/or 600 may further include a layer of magnetic material. In these embodiments, the layer of magnetic material may be a soft magnetic material, such as ferrite. In other embodiments, the material suitable to have magnetic properties that induces the eddy currents may be other material besides ferrite such as rare earth magnetics, aluminum, iron, cobalt, nickel, and/or the like. It should be appreciated that the layer of magnetic material may be added using conventional techniques as appreciated by those skilled in the art. As such, the magnetic layer may form a sheet along the surface of the coupler 300, 400, 500, and 600. Further, it should be appreciated that the thickness of the layer of magnetic material may change based on the type of magnetic material, the air gap between the coupler and the sensor, and the like.

Now referring back to FIG. 2, the geometric shape of the example coupler 200 will be described. It should be appreciated that that the discussion herein with regards to the geometric shape for the example coupler 200 is the same for the four-pole example coupler 300 (FIG. 3), the three-pole example coupler 400 (FIG. 4), the two-pole example coupler 500 (FIG. 5), and the one-pole example coupler 600 (FIG. 6). Thus, only the geometric arrangement for forming the shape of the example coupler 200 will be described in detail.

It should also be appreciated that the geometric arrangement of the example coupler 200 corrects a nonsinusoidal input signal to a signal processor 706 (FIG. 7). That is, the geometric shape having a continuous curve, or smooth profile, of the example coupler 200 corrects for high order geometry harmonic errors to improve the sensor linearity errors and air gap performance by allowing the eddy current to pass through the smooth profile. The geometric shape of the example coupler 200 is determined from the following parametric equation:

$$\begin{cases} x(\theta) = (a + b*\cos(N\theta))*\cos(\theta) \\ y(\theta) = (a + b*\cos(N\theta))*\sin(\theta) \end{cases}, 0 \le \theta \le 360°$$

where "N" is equal to the number of poles in the sensor assembly, "a" is a coupler diameter, "b" is a difference between the radii of a middle circle and a maximum and/or minimum circle, and "θ" is a variable to define the coupler shape, as discussed in greater detail herein. That is, "θ" may be a plotted point forming the continuous curve of the coupler and having an angle with respect to a center point, as discussed in greater detail herein.

With reference still to FIG. 2, the example coupler 200 is depicted as a three-pole coupler having three lobes 202. It should be appreciated that the coupler 200 is not limited to three lobes 202 and may vary depending on the number of poles, as discussed in greater detail herein. To determine or calculate the continuous curve contour, a plurality of imaginary circles are plotted, illustrated as dash-dot-dot lines, in FIG. 2 to help illustrate the minimum parameters, the maximum parameters, the transitions between lobes, and the like. As such, based on the equations above, each lobe 202 may be plotted as having an outermost portion 204, or point or series of points, a transition portion 206, a center point 208 and the like, as discussed in greater detail herein.

A first circle 210, or the minimum circle, is depicted as extending radially outward from the center point 208 and having a circumference that forms the position of the transition portion 206 between the lobes 202. That is, each transition portion 206 is an arcuate or continuous curve having a radius of curvature between the lobes 202, which extends inward towards the center point 208. The transition portion 206 may be positioned, or plotted, when cos (θ)=−1. As such, it should be appreciated that in the example coupler 200, there are three points where cos (θ)=−1, and as such, there are three transition portions 206, one portion between each lobe 202. Each of the tree transition portions 206 are arcuate having a radius of curvature, which extends inward towards the center point 208.

A second circle 212, or the maximum circle, is depicted as extending radially outward from the center point 208 and having a circumference that forms the position of the outermost portions 204 of each lobe 202. As such, the second circle 212 has a larger radius and circumference that the first circle 210. That is, each lobe 202 has an outermost portion 204 where the outermost portion 204 is an arcuate or continuous curve of the lobes 202. The outermost portion 204 may be positioned, or plotted, when cos ($\theta$)=1. As such, it should be appreciated that in the example coupler 200, there are three points where cos ($\theta$)=1, and as such, there are three outermost portions 204 that are equal distance from the center point 208, one portion for each lobe 202. Further, in some embodiments, the outermost portions 204 of each lobe 202 does not extend beyond an outer diameter of the transmitter coil 702, as discussed in greater detail below. That is, the maximum length (i.e., in the +/−X-direction) and/or width (i.e., in the +/−Y-direction) of the example coupler 200 may be limited by the outer diameter of the transmitter coil 702.

A third circle 214, or the middle circle, is spaced evenly between the first and second circles 210, 212. As such, the third circle 214 extends radially outward away from the first circle 210 towards the second circle 212. Therefore, as depicted, the third circle 214 intersects or goes through the each of the lobes 202 generally at an equal distance between the transition portion 206 of the lobes 202 and the outermost portion 204 of each lobe 202.

Still referring to FIG. 2, a Y-axis 216, or ordinate, and an X-axis 218, or abscissa, intersects at the center point 208. The center point 208, the X-axis 218 and/or the Y-axis 216 may be used to assist in forming, or plotting, the coupler shape from the equation above. For example, the "a" term in the above equation may be the radius of the third circle 214 measured as a straight line 220 from the center point 208. The term "a" may be associated with the example coupler 200 diameter. As another example, the "b" term of the above equation may be the difference between a radius 222 of the third circle 214 taken from the outer circumference of the first circle 210 and a radius 224 of the second circle 212 taken from the outer circumference of the third circle 214. As such, the term "b" may be a scalar associated with the error and proportional to the system. Therefore, in some embodiments, the "a" term may be a constant specific to the diameter and the "b" term may be a constant specific to the system.

The term "x($\theta$)", as depicted in FIG. 2, may be an X-coordinate point measured horizontally from the Y-axis 216 to a position 226 beyond the first circle 210 and the term "y($\theta$)", as depicted in FIG. 2, may be measured vertically from the X-axis 218 to a position 228 beyond the first circle 210 to form a Y-coordinate point. Together, the X-coordinate point at position 226 and the Y-coordinate point at position 228 form a plot point 230. As such, it should be appreciated that this continues along with the outermost portion 204 and the transition portions 206 to from the continuous coupler shape.

Figure 3:
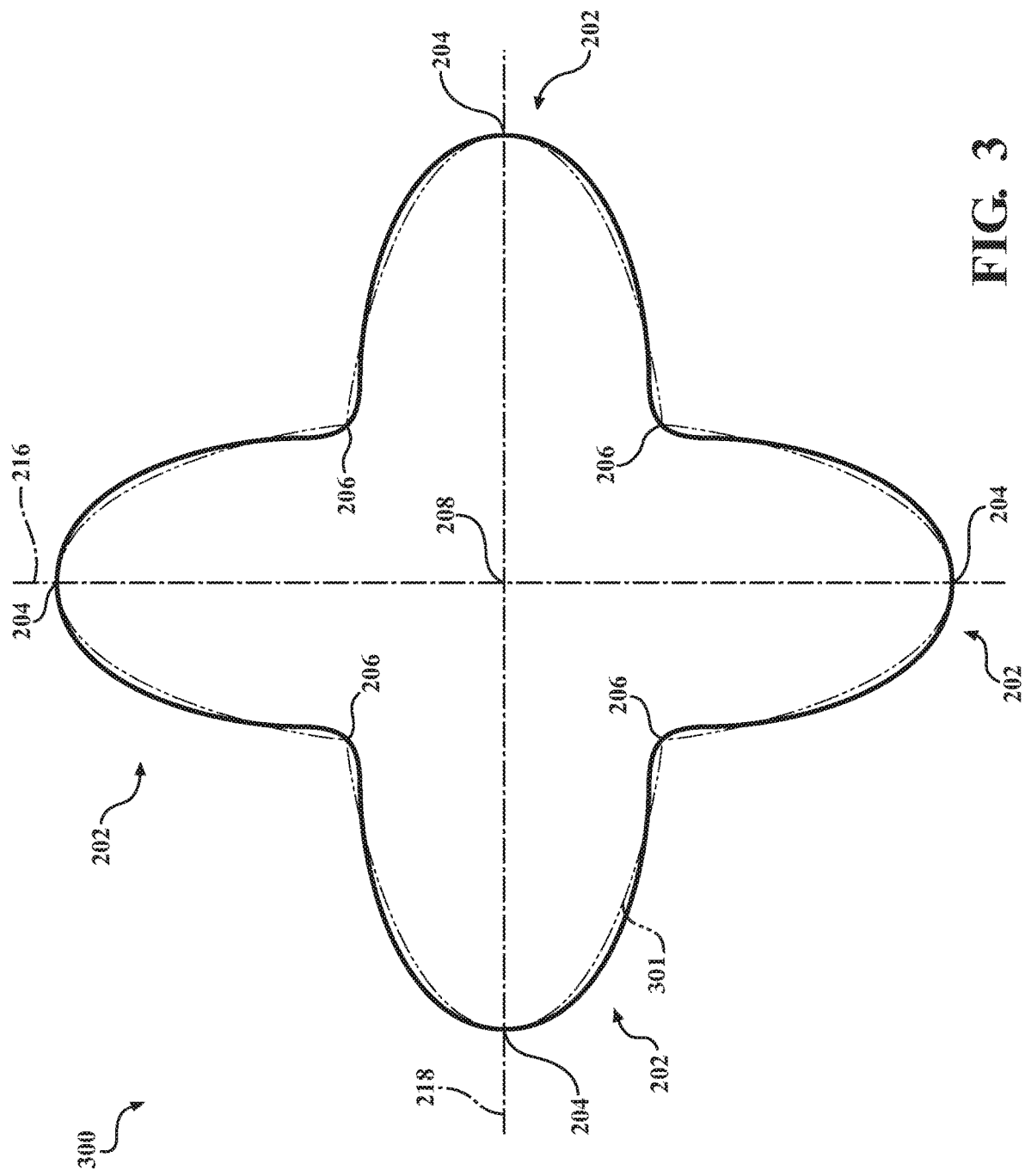
FIG. 3 is a four-pole continuous curve contour coupler according to one or more embodiments herein.
Figure 4:
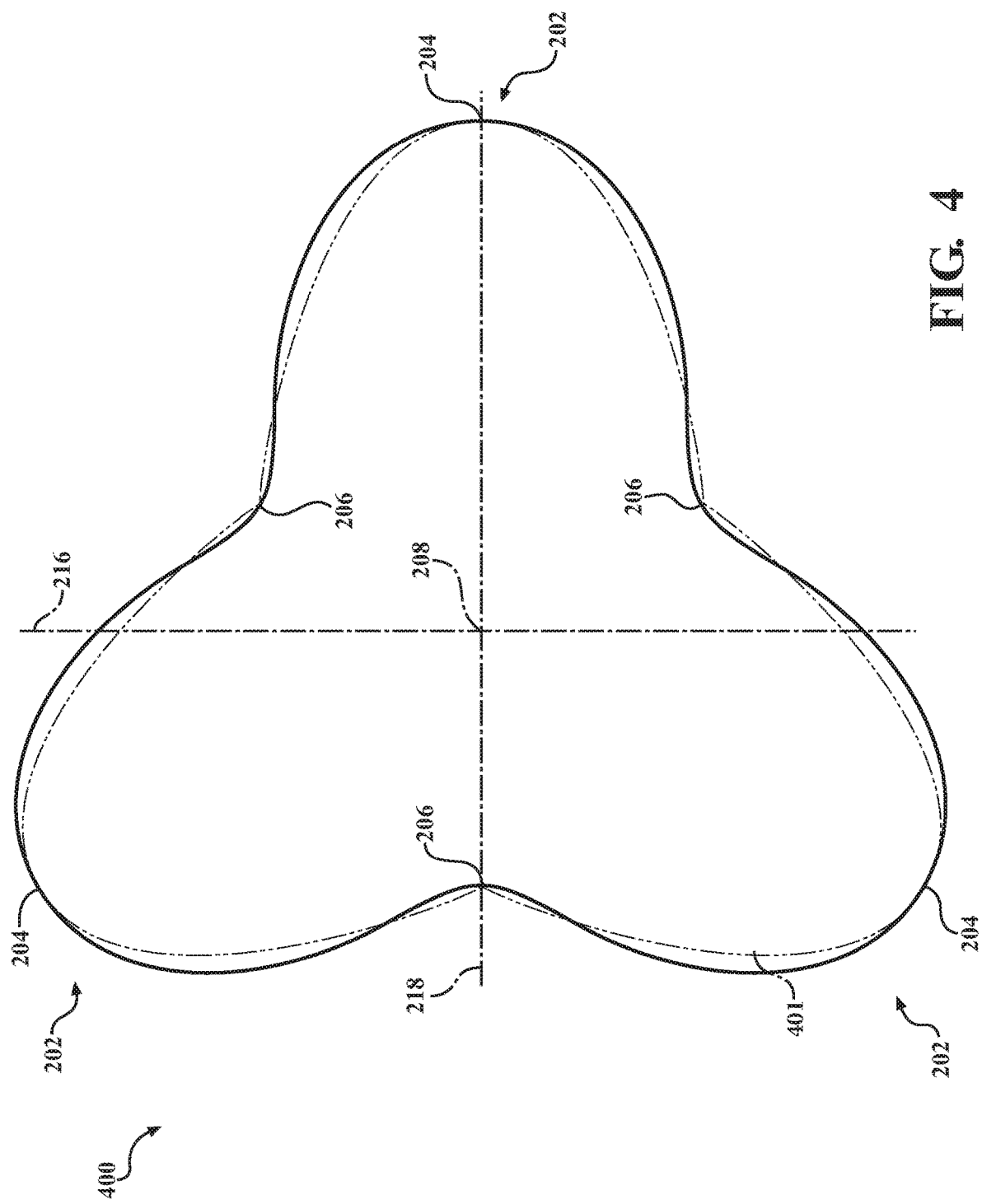
FIG. 4 is a three-pole continuous curve contour coupler according to one or more embodiments herein.
Figure 5:
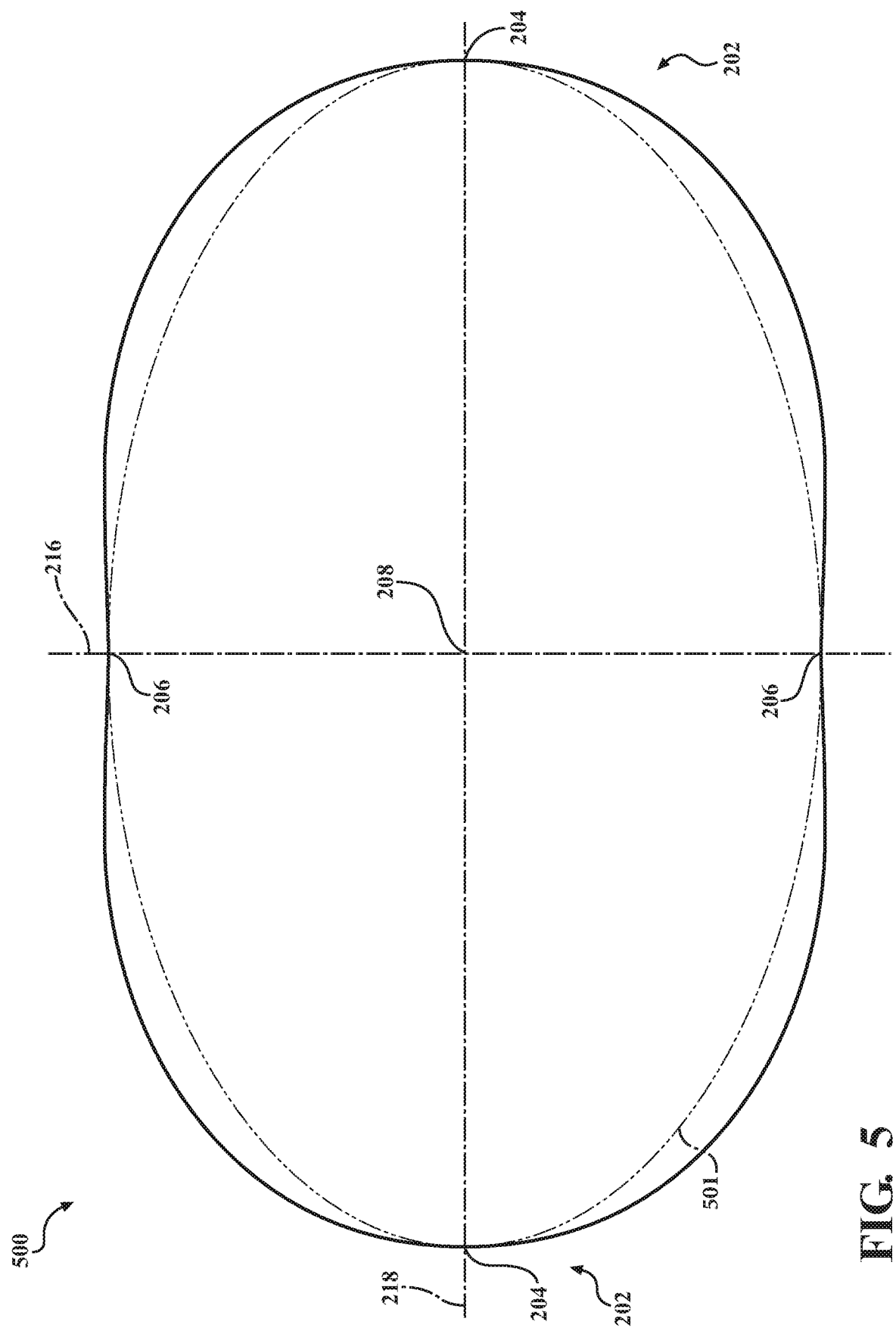
FIG. 5 is a two-pole continuous curve contour coupler according to one or more embodiments herein.

With reference now back to FIGS. 3-6, a comparison between the prior art couplers and the example couplers 300, 400, 500 and 600 will be described. It should be appreciated that FIG. 3 schematically depicts a four-pole continuous curve contour coupler 300, FIG. 4 schematically depicts a three-pole continuous curve contour coupler 400, FIG. 5 schematically depicts a two-pole continuous curve contour coupler 500 and FIG. 6 schematically depicts a one-pole continuous curve contour coupler 600. It should be noted that each of the FIGS. 3-6 include the Y-axis 216, or ordinate and the X-axis 218, or abscissa and the center point 208. Further, the center point 208 may not be centered within the example couplers 300, 400, 500 and 600. For example, the center point 208 of the one-pole coupler 600 (FIG. 6) has an offset such that upon movement of the coupler 600, whether rotational or linearly movement, the first and second receiver coils 714, 716 (FIG. 7A) are not always covered by the coupler 600. That is, the one-pole coupler 600 may be offset for differential signal recognition. Further, while the example couplers 300, 400, and 500 of FIGS. 3-5 show that the lobes 202 are uniform, or equal, the lobes 202 do not necessarily need to be uniform and/or equal. Further, in some embodiments, the example coupler may have a geometric continuous curve shape that is not a lobe but is circular. For example, the one-pole example coupler 600 may have a geometric continuous curve shape 602, which may be circular and not a lobe shape. As such, in some embodiments, the geometric continuous curve shape 602 may have a plurality of outermost portions without an innermost portion to form a circles, as appreciated by one skilled in the art.

With reference now to FIGS. 7A-7B and again to FIG. 6, a first example sensor assembly 700 that includes the one pole continuous curve contour coupler 600 is schematically depicted. The sensor assembly includes a transmitter coil 702 and two-part receiver coil 704, a signal processor 706, and, in some embodiments, a printed circuit board (PCB) 708. The transmitter coil 702 may be one or more loops in a conventional circular coil design, or other configurations can be used. The transmitter coil 702 has a predetermined inner diameter 710 and a predetermined outer diameter 712. The transmitter coil 702, which may also be referred to as an exciter coil, may be powered by an alternating current source. When excited by electrical energy, the transmitter coil 702 radiates electromagnetic radiation. There is inductive coupling between the transmitter coil 702 and any other proximate coils, which induces a signal in that coil. The two-part receiver coil 704 includes a first receiver coil 714 and a second receiver coil 716. Inductive coupling between the transmitter coil 702 and the two-part receiver coil 704 generates a receiver signal in the two-part receiver coil 704.

For example, the term 'receiver signal' can be used generally to refer to signals induced in the receiver coil, and also to any conditioned signal based on the signals induced in the two-part receiver coil 704. In examples discussed below, a single receiver signal is provided by the two-part receiver coil 704 that includes contributions from a first and second signal formed in the first receiver coil 714 and the second receiver coil 716 loop configurations. That is, the first receiver coil 714 and the second receiver coil 716 provide first and second signals, respectively. The receiver signal is then some combination of the first and second signals.

For example, the first receiver coil 714 and the second receiver coil 716 configurations may be configured to generate signals that are of opposite phase, the receiver signal being the combination of the first and second signals, and hence the receiver signal has a minimum value when the first and second signals have similar magnitudes. The receiver signal may also be termed a difference signal, as the magnitude of the receiver signal is a difference between a first signal amplitude induced in the first receiver coil 714, and a second signal amplitude induced in the second receiver coil 716.

In other examples of the present invention, the two-part receiver coil 704 may provide separate first and second signals from separate loop structures to an electronic circuit for processing.

Still referring to FIGS. 7A-7B, the first and the second receiver coils 714, 716 may be offset radially outwardly from one another. That is, the first and the second receiver coils 714, 716 may be offset in a vertical direction and may be generally disposed within the outer diameter 712 of the transmitter coil 702. As such, the one-pole coupler 600 generally moves, either rotationally or linearly, within the outer diameter 712 of the transmitter coil 702. However, in some embodiments, the coupler or a portion thereof may rotate or move wholly within the inner diameter 710 of the transmitter coil 702.

The first receiver coil 714 and the second receiver coil 716 configurations of the two-part receiver coil 704 may be configured to provide first and second voltages of opposite polarity for a given magnetic flux change through the two-part receiver coil 704. The two-part receiver coil 704 may be configured so that the first and second signals tend to cancel each other in the absence of the coupler 600. The coupler 600 also may have a zero position in which it blocks flux transmission to the first receiver coil 714 and the second receiver coil 716 equally, such that the first signal and second signal effectively cancel each other out. As the coupler 600 moves in a first direction relative to the initial position, it blocks more magnetic flux inducing the second signal, while at the same time blocking less magnetic flux that induces the first signal. Hence, the magnitude of the first signal increases, the magnitude of the second signal decreases, and the receiver signal increases in magnitude. The coupler 600 may also be moveable in a second direction, in which the magnitude of the second signal increases, and that of the first signal decreases. It should be appreciated that the coupler 600 rotates or moves at a distance from the transmitter coil 702 and the two-part receiver coil 704. In some embodiments, the coupler 600 rotates concentrically with first and second receiver coils 714, 716, as discussed in detail herein.

The first receiver coil 714 and the second receiver coil 716 may be positioned in separate layers of the PCB 708 in the axial direction or in the vertical direction (i.e., in the +/−Z-direction) such that a difference in the distance or air gap between the sensor assembly 700 and the coupler 600 is created. It should be appreciated that the depth of the first receiver coil 714 and the second receiver coil 716 are selected with a relationship to the coupler 600 based on, in some embodiments, a strength of the signal required for the air gap or distance. That is, in some embodiments, the first receiver coil 714 may be in one layer of the PCB 708 and the second receiver coil 716 is in an another or different layer of the PCB 708 from the first receiver coil 714. In some embodiments, the first receiver coil 714 and the second receiver coil 716 may be positioned in adjacent or adjoining layers. In other embodiments, the first receiver coil 714 and the second receiver coil 718 may be positioned in layers that are spaced apart or separated by another layer that may be unoccupied or may contain other coils (i.e., a portion of the transmitter coil and the like).

As such, portions of the first receiver coil 714 may overlap portions of the second receiver coil 718 and portions of the second receiver coil 718 under lap portions of the first receiver coil 714. As such, it should be appreciated that the overlap portions are not connected with the path of the coil above and/or below, and that this coil arrangement permits sensing of the coupler 600 from different distances or air gaps and permits the first receiver coil 714 and the second receiver coil 718 to act as independent coils. In yet other embodiments, portions of the first receiver coil 714 and the second receiver coil 718 are disposed within the same layer of the PCB 708 so to have the same depth in the vertical direction (i.e., in the +/−Z-direction) or air gap from the coupler 600.

The first receiver coil 714 and the second receiver coil 718 may be coplanar with the transmitter coil 702 or may be in parallel planes with each other and/or with the transmitter coil 702. It should be appreciated that the two-part receiver coil 704 is above the transmitter coil 702 in the axial or vertical direction (i.e., in the +/−Z-direction) with respect to the coupler 600. In some embodiments, the coupler 600 is coaxially aligned along a central axis 720 at the center point 208. It should also be appreciated that the PCB 708 may have more than three layers and that some layers may be unoccupied by a coil or the like.

With reference back to FIGS. 3-6 and with continued reference to FIG. 7 and the description above, it should be appreciated that the configuration of the two-part receiver coil 704 may be such that a voltage is developed at the output of the two-part receiver coil 704, which is a function of the position of the coupler 300, 400, 500 and/or 600. The coupler 300, 400, 500 and/or 600 may have an initial position, relative to the two-part receiver coil 704, at which the receiver signal is a minimum. As the coupler 300, 400, 500 and/or 600 moves from the initial position, it modifies the inductive coupling between the transmitter coil 702 and the two-part receiver coil 704 configurations. In some embodiments, the initial configuration of the coupler 300, 400, 500 and/or 600, a first and second signals—one for the first receiver coil 714 and one for the second receiver coil 716—are of similar magnitude and of opposite phase, so they tend to cancel each other out. As the coupler 300, 400, 500 and/or 600 moves, the inductive coupling between the transmitter coil 702 and a first receiver coil 714 increases, and at the same time the inductive coupling between the transmitter coil 702 and the second receiver coil 716 decreases, while the signal output has reduced harmonic errors. It should be appreciated that the coupler 300, 400, 500 and/or 600 need not modify the total flux coupling between the transmitter coil 702 and the two-part receiver coil 704, but may only modify the spatial distribution of the flux coupling.

With reference now to FIGS. 8A-8B, a second example sensor assembly 800 that includes the two-pole continuous curve contour coupler 500 is schematically depicted. The second example sensor assembly 800 is similar to the first example sensor assembly 700 with the exception that the second example sensor assembly 800 includes the two-pole coupler 500 and that first and second receiver coils 714, 716 of the two-part receiver coil 704 includes additional loops. As such, similar element numbers are used. The two-pole continuous contour coupler 500 includes two lobes 202, opposite of each other, each having an outermost portions 204 equal distance from the center point 208, and each connected by transition portions 206. In some embodiments, the two-pole continuous contour coupler 500 may be a Cassini oval, a cardoid, and/or the like. The two-pole coupler 500 generally moves, whether rotationally or linearly, within the outer diameter 712 of the transmitter coil 702. However, in some embodiments, the coupler 500 or a portion thereof may rotate within the inner diameter 710 and/or beyond the outer diameter 712 of the transmitter coil 702.

Figure 9:
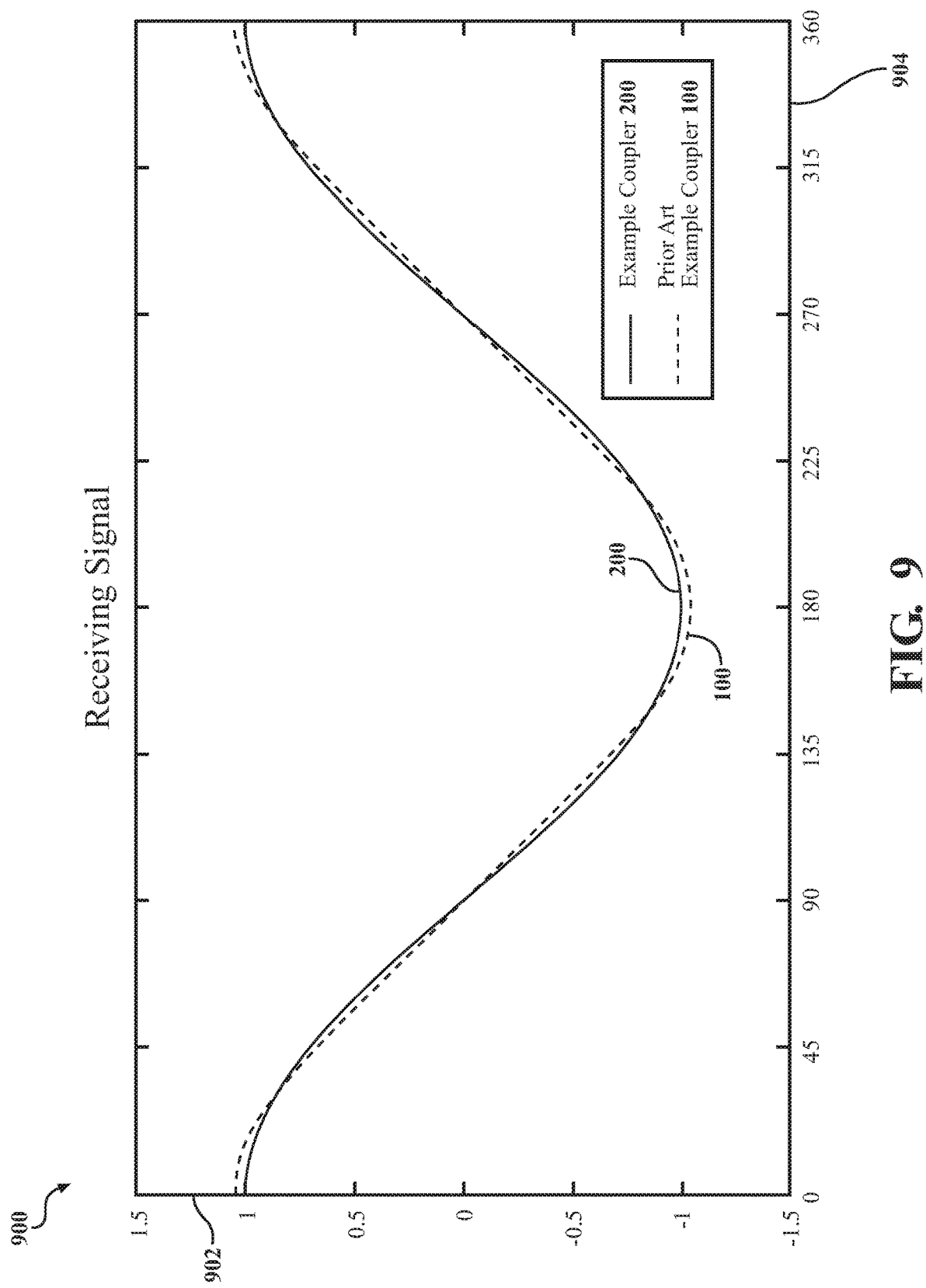
FIG. 9 schematically depicts a plot of a receiving signal according to one or more embodiments herein.

With reference to FIG. 9, an illustrative plot 900 of the receiving signal is schematically depicted. The illustrative plot 900 schematically illustrates the difference in the receiving signal between the prior art coupler 100 (FIG. 1), depicted as a dotted line in FIG. 9, and the example coupler 200 (FIG. 2), depicted as a solid line in FIG. 9.

An ordinate 902 represents an amplitude of the receiving signal and is illustrated as being in a range between 1.5 to −1.5, and an abscissa 904 represents degrees, or time, and is in a range between 0 degrees-360 degrees. As shown in FIG. 9, the receiving signal from the prior art coupler 100 and illustrated as the dotted line, has high order harmonic components which cause the waveform to deviate from a pure sinusoidal waveform. The receiving signal from the example coupler 200, illustrated as the solid line, does not have the high order harmonic components and the waveform is, or nearly is, a pure sinusoidal waveform.

FIG. 9 illustrates that the geometric shape of the example coupler 200 has compensated for any of the high order harmonic components found in the waveform of the receiving signal.

Thus is disclosed is a novel continuous coupler contour for many different poles including a one-pole, a two-pole, a three-pole and a four-pole sensor assembly. It should be understood that the continuous coupler contour has a smooth profile that leads to improved linearity and air gap performance. Further, the smooth profile of the continuous coupler contour enhances manufacturability, reduces tooling wear due to the reduction in sharp corners, and reduces the stress concentration on the coupler, the sensor assembly, a shaft, and/or the like. It should be clear to those skilled in the art, that many variations are available within the scope of the invention.

What is claimed is:

1. An inductive sensor assembly comprising:
   a sensor assembly comprising:
      a transmitter coil having an inner diameter and an outer diameter,
      a receiver coil positioned within the outer diameter of the transmitter coil,
      a coupler element having at least a layer of a magnetic material to induce eddy currents and having a continuous curve shape, the continuous curve shape having at least two transition portions that each are arcuate having a radius of curvature which extends inward towards a center point and at least a pair of lobes connected by the at least two transition portions, the coupler element positioned within the outer diameter of the transmitter coil such that a maximum diameter of the continuous curve shape is the outer diameter of the transmitter coil,
   wherein when the coupler element is moved, the continuous curve shape of the coupler element modifies an inductive coupling between the transmitter coil and the receiver coil, and
   wherein a shape of the continuous curve shape of the coupler element is defined by a first equation:

$$\begin{cases} x(\theta) = (a + b*\cos(N\theta))*\cos(\theta) \\ y(\theta) = (a + b*\cos(N\theta))*\sin(\theta) \end{cases}, 0 \leq \theta \leq 360°$$

where "N" is equal to a number of poles in the sensor assembly, "a" is a diameter of the coupler element, "b" is a difference between a middle radius of the continuous curve shape of the coupler element and a maximum and/or minimum radius of the continuous curve shape of the coupler element, and "θ" is a variable of a plotted point having an angle with respect to the center point to define the continuous curve shape.

2. The inductive sensor assembly of claim 1, wherein:
an outermost portion of each one of the at least a pair of lobes is the maximum parameter of the continuous curve shape of the coupler element and defined by a second equation: cos (N θ)=1.

3. The inductive sensor assembly of claim 2, wherein:
the radius of curvature of the at least two transition portions of the coupler element positioned between each lobe of the at least a pair of lobes is the minimum parameter of the continuous curve shape of the coupler element and defined by a third equation: cos (N θ)=−1.

4. The inductive sensor assembly of claim 3, wherein:
the at least a pair of lobes of the continuous curve shape of the coupler element is four lobes interconnected to form a four-pole coupler element, each lobe of the four lobes having the outermost portion that extends outwardly from the center point by an equal length, and the at least two transition portions are four transition portions positioned between each of the four lobes and is defined by the minimum parameter determined from the third equation.

5. The inductive sensor assembly of claim 3, wherein:
the at least a pair of lobes of the continuous curve shape of the coupler element is three lobes interconnected to form a three-pole coupler element, each lobe of the three lobes having the outermost portion that extends outwardly from the center point by an equal length, and the at least two transition portions are three transition portions positioned between each of the three lobes and is defined by the minimum parameter via the third equation.

6. The inductive sensor assembly of claim 1, wherein the receiver coil is a two-part receiver coil.

7. The inductive sensor assembly of claim 1, wherein the movement of the coupler element is rotational.

8. The inductive sensor assembly of claim 1, wherein the movement of the coupler element is linearly.

9. The inductive sensor assembly of claim 1, wherein the continuous curve shape of the coupler element compensates for a plurality of high order harmonic components found in a waveform of a receiving signal.

10. The inductive sensor assembly of claim 1, wherein the continuous curve shape of the coupler element forms a contour that has a smooth profile, the smooth profile compensates for a plurality of high order harmonic components found in a waveform of a receiving signal.

11. The inductive sensor assembly of claim 1, wherein the sensor is co-axially aligned with the coupler element.

12. The inductive sensor assembly of claim 1, wherein the layer of the magnetic material is a soft magnetic material.

13. An inductive sensor assembly comprising:
   a sensor assembly comprising:
      a transmitter coil having an inner diameter and an outer diameter,
      a receiver coil positioned within the outer diameter of the transmitter coil,
      a coupler element having at least a layer of a magnetic material to induce eddy currents and having a continuous curve shape, the continuous curve shape having three transition portions that each are arcuate having a radius of curvature which extends inward towards a center point and three lobes connected by the three transition portions, the coupler element positioned within the outer diameter of the transmitter coil such that a maximum diameter of the continuous curve shape is the outer diameter of the transmitter coil, wherein when the coupler element is moved, the continuous curve shape of the coupler element modifies an inductive coupling between the transmitter coil and the receiver coil, wherein a shape of the continuous curve shape of the coupler element is defined by a first equation:

$$\begin{cases} x(\theta) = (a + b*\cos(N\theta))*\cos(\theta) \\ y(\theta) = (a + b*\cos(N\theta))*\sin(\theta) \end{cases}, 0 \leq \theta \leq 360°$$

where "N" is equal to three, "a" is a diameter of the coupler element, "b" is a difference between a middle radius of the continuous curve shape of the coupler element and a maximum and/or minimum radius of the continuous curve shape of the coupler element, and "θ" is a variable of a plotted point having an angle with respect to the center point to define the continuous curve shape.

14. The inductive sensor assembly of claim 13, wherein: the coupler element is a three-pole coupler element, each of the three lobes are interconnected and each have an outermost point that extends outwardly from the center point by an equal length, the outermost point is defined by a second equation: cos (N θ)=1.

15. The inductive sensor assembly of claim 13, wherein a minimum point of each of the three transition portions is defined from a third equation: cos (N θ)=−1.

16. The inductive sensor assembly of claim 13, wherein the sensor is co-axially aligned with the coupler element.

17. An inductive sensor assembly comprising:
a sensor assembly comprising:
a transmitter coil having an inner diameter and an outer diameter,
a receiver coil positioned within the outer diameter of the transmitter coil,
a coupler element having at least a layer of a magnetic material to induce eddy currents and having a continuous curve shape, the continuous curve shape having four transition portions that each are arcuate having a radius of curvature which extends inward towards a center point and four lobes connected by the four transition portions, the coupler element positioned within the outer diameter of the transmitter coil such that a maximum diameter of the continuous curve shape is the outer diameter of the transmitter coil, wherein when the coupler element is moved, the continuous curve shape of the coupler element modifies an inductive coupling between the transmitter coil and the receiver coil, wherein a shape of the continuous curve shape of the coupler element is defined by a first equation:

$$\begin{cases} x(\theta) = (a + b*\cos(N\theta))*\cos(\theta) \\ y(\theta) = (a + b*\cos(N\theta))*\sin(\theta) \end{cases}, 0 \leq \theta \leq 360°$$

where "N" is equal to four, "a" is a diameter of the coupler element, "b" is a difference between a middle radius of the continuous curve shape of the coupler element and a maximum and/or minimum radius of the continuous curve shape of the coupler element, and "θ" is a variable of a plotted point having an angle with respect to the center point to define the continuous curve shape.

18. The inductive sensor assembly of claim 17, wherein: the coupler element is a four-pole coupler element, each of the four lobes are interconnected and each have an outermost point that extends outwardly from the center point by an equal length, the outermost point is defined by a second equation: cos (N θ)=1.

19. The inductive sensor assembly of claim 17, wherein a minimum point of each of the four transition portions is defined from a third equation: cos (N θ)=−1.

20. The inductive sensor assembly of claim 17, wherein the sensor is co-axially aligned with the coupler element.

* * * * *